(12) United States Patent
Sun et al.

(10) Patent No.: US 12,457,063 B2
(45) Date of Patent: Oct. 28, 2025

(54) METHOD AND APPARATUS FOR CBG BASED TRANSMISSION FOR NR SIDELINK

(71) Applicant: Lenovo (Beijing) Ltd., Beijing (CN)

(72) Inventors: Zhennian Sun, Chaoyang District (CN); Xiaodong Yu, Haidian District (CN); Haipeng Lei, Haidian District (CN); Haiming Wang, Xicheng District (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 559 days.

(21) Appl. No.: 17/783,542

(22) PCT Filed: Dec. 27, 2019

(86) PCT No.: PCT/CN2019/129442
§ 371 (c)(1),
(2) Date: Jun. 8, 2022

(87) PCT Pub. No.: WO2021/128344
PCT Pub. Date: Jul. 1, 2021

(65) Prior Publication Data
US 2023/0008375 A1  Jan. 12, 2023

(51) Int. Cl.
*H04L 1/1829* (2023.01)
*H04W 72/23* (2023.01)

(52) U.S. Cl.
CPC .......... *H04L 1/1861* (2013.01); *H04W 72/23* (2023.01)

(58) Field of Classification Search
CPC ............................ H04L 1/1861; H04W 72/23
See application file for complete search history.

(56) References Cited

U.S. PATENT DOCUMENTS

2018/0287745 A1* 10/2018 Sun ................... H03M 13/1111
2019/0158250 A1*  5/2019 Ang ..................... H04L 5/0055

FOREIGN PATENT DOCUMENTS

CN       110495114 A    11/2019
WO    20180185896 A1    10/2018
(Continued)

OTHER PUBLICATIONS

PCT/CN2019/129442, "International Preliminary Report on Patentability", PCT Application No. PCT/CN2019/129442, Jul. 7, 2022, 5 pages.
(Continued)

*Primary Examiner* — Samina F Choudhry
(74) *Attorney, Agent, or Firm* — FIG. 1 Patents

(57) ABSTRACT

Embodiments of the present application are related to a method and apparatus for code block group (CBG)-based transmission for 3GPP 5G New Radio (NR) sidelink (SL). A method for wireless communication performed by a UE according to an embodiment of the present application includes: in response to a CBG-based transmission being enabled, transmitting a CBG-based transmission on a SL, wherein the CBG-based transmission includes one or more CBGs; receiving hybrid automatic repeat request-acknowledge (HARQ-ACK) feedback corresponding to the one or more CBGs; and in response to the HARQ-ACK feedback, transmitting an indicator on a physical uplink control channel (PUCCH) resource to request a resource for a CBG-based retransmission.

20 Claims, 7 Drawing Sheets

(56) References Cited

FOREIGN PATENT DOCUMENTS

| WO | WO-2018185896 | A1 | * | 10/2018 | ............... | H04L 1/08 |
| WO | 20180203405 | A1 | | 11/2018 | | |
| WO | 20180203406 | A1 | | 11/2018 | | |

OTHER PUBLICATIONS

PCT/CN2019/129442, "International Search Report and Written Opinion", PCT Application No. PCT/CN2019/129442, Sep. 15, 2020, 6 pages.

* cited by examiner

| Maximum number of CBG(s) included in a TB | Bits for CBG-based HARQ-ACK feedback | Bits for a total number of actually transmitted CBGs |
|---|---|---|
| 2 | 2 bits | 1 bits |
| 4 | 4 bits | 2 bits |
| 6 | 6 bits | 3 bits |
| 8 | 8 bits | 3 bits |

FIG. 5

| Maximum number of CBG(s) included in a TB | Bits for a total number of incorrectly decoded CBGs | Bits for a total number of actually transmitted CBGs |
|---|---|---|
| 2 | 2 bits | 1 bits |
| 4 | 3 bits | 2 bits |
| 6 | 3 bits | 3 bits |
| 8 | 4 bits | 3 bits |

FIG. 6A

| Maximum number of CBG(s) included in a TB | Bits for a total number of correctly decoded CBGs | Bits for a total number of actually transmitted CBGs |
|---|---|---|
| 2 | 2 bits | 1 bits |
| 4 | 3 bits | 2 bits |
| 6 | 3 bits | 3 bits |
| 8 | 4 bits | 3 bits |

FIG. 6B

| Total number of actually transmitted CBGs | Values of ratios |
|---|---|
| 1 | {0, 1}/1 |
| 2 | {0, 1, 2}/2 |
| 3 | {0, 1, 2, 3}/3 |
| 4 | {0, 1, 2, 3, 4}/4 |
| 5 | {0, 1, 2, 3, 4, 5}/5 |
| 6 | {0, 1, 2, 3, 4, 5, 6}/6 |
| 7 | {0, 1, 2, 3, 4, 5, 6, 7}/7 |
| 8 | {0, 1, 2, 3, 4, 5, 6, 7, 8}/8 |

FIG. 7

| Maximum number of CBG(s) included in a TB | Values of Ratios | Bits in PUCCH resource |
|---|---|---|
| 2 | {0, 1/2, 1} | 2 bits |
| 4 | {0, 1/4, 1/3, 1/2, 2/3, 3/4, 1} | 3 bits |
| 6 | {0, 1/6, 1/5, 1/4, 1/3, 2/5, 1/2, 2/3, 3/5, 3/4, 5/6, 1} | 4 bits |
| 8 | {0, 1/8, 1/7, 1/6, 1/5, 1/4, 1/3, 2/7, 2/5, 1/2, 2/3, 3/8, 3/7, 3/5, 3/4, 4/7, 4/5, 5/8, 5/7, 5/6, 6/7, 7/8, 1} | 5 bits |

FIG. 8

2 bits on PUCCH resource

| Value in PUCCH resource | Ratio of requested resources |
|---|---|
| '00' | 0 |
| '01' | 1/3 |
| '10' | 2/3 |
| '11' | 100% |

FIG. 9

METHOD AND APPARATUS FOR CBG BASED TRANSMISSION FOR NR SIDELINK

TECHNICAL FIELD

Embodiments of the present application generally relate to wireless communication technology, especially to a method and an apparatus for CBG based transmission for 3GPP (3rd Generation Partnership Project) 5G new radio (NR) sidelink (SL).

BACKGROUND

Vehicle to everything (V2X) has been introduced into 5G wireless communication technology. In terms of a channel structure of V2X communication, a direct link between two user equipments (UEs) is called a sidelink (SL). Sidelink is a long-term evolution (LTE) feature introduced in 3GPP Release 12, and enables a direct communication between proximal UEs, and data does not need to go through a base station (BS) or a core network.

In 3GPP Release 16, a sidelink hybrid automatic repeat request-acknowledge (HARQ-ACK) report to BS is supported for better resource allocation, but only transport block (TB) based HARQ-ACK feedback is supported. 3GPP 5G NR aims to adopt a code block group (CBG) based HARQ-ACK feedback mechanism. However, details of a CBG-based HARQ-ACK feedback mechanism have not been discussed in 3GPP 5G NR technology yet.

SUMMARY

Some embodiments of the present application provide a method for wireless communication performed by a user equipment (UE). The method includes: in response to a code block group (CBG)-based transmission being enabled, transmitting a CBG-based transmission on a sidelink (SL), wherein the CBG-based transmission includes one or more CBGs; receiving hybrid automatic repeat request-acknowledge (HARQ-ACK) feedback corresponding to the one or more CBGs; and in response to the HARQ-ACK feedback, transmitting an indicator on a physical uplink control channel (PUCCH) resource to request a resource for a CBG-based retransmission.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method for wireless communication performed by a UE.

Some embodiments of the present application provide a method for wireless communication performed by a base station (BS). The method includes: in response to a code block group (CBG)-based transmission being enabled, transmitting a sidelink (SL) grant information, wherein the SL grant information indicates one or more resources allocated for a CBG-based transmission on a SL, the SL grant information further indicates a physical uplink control channel (PUCCH) resource, and the CBG-based transmission includes one or more CBGs; and receiving an indicator on the PUCCH resource, wherein the indicator requests a resource for a CBG-based retransmission.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method for wireless communication performed by a BS.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 5 illustrates an exemplary mapping table related to a CBG-based transmission in accordance with some embodiments of the present application;

FIG. 6A illustrates a further exemplary mapping table related to a CBG-based transmission in accordance with some embodiments of the present application;

FIG. 6B illustrates another exemplary mapping table related to a CBG-based transmission in accordance with some embodiments of the present application;

FIG. 7 illustrates an exemplary mapping table related to ratios of resources in accordance with some embodiments of the present application;

FIG. 8 illustrates a further exemplary mapping table related to ratios of resources in accordance with some embodiments of the present application;

FIG. 9 illustrates another exemplary mapping table related to ratios of resources in accordance with some embodiments of the present application;

DETAILED DESCRIPTION

Figure 1:
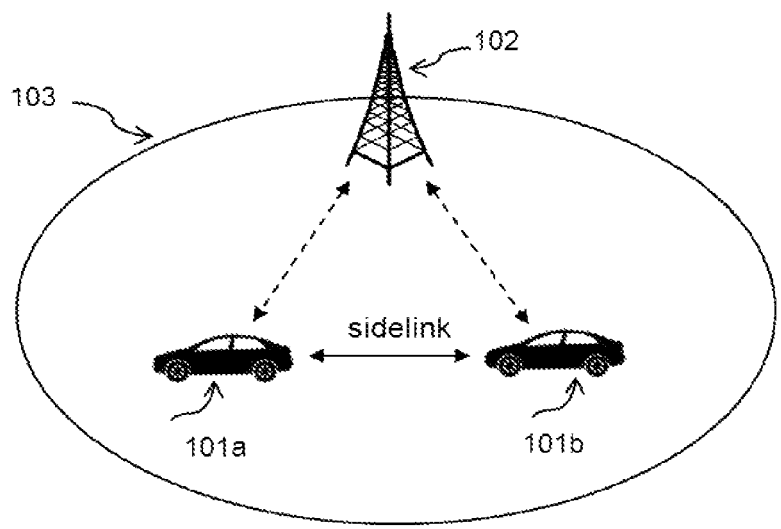
FIG. 1 illustrates an exemplary V2X communication system in accordance with some embodiments of the present application.

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

UE(s) under NR V2X scenario may be referred to as V2X UE(s). A V2X UE, which transmits data according to sidelink resource(s) scheduled by a base station (BS), may be referred to as a UE for transmitting, a transmitting UE, a transmitting V2X UE, a Tx UE, a V2X Tx UE, a SL Tx UE, or the like. A V2X UE, which receives data according to sidelink resource(s) scheduled by a BS, may be referred to as a UE for receiving, a receiving UE, a receiving V2X UE, a Rx UE, a V2X Rx UE, a SL Rx UE, or the like.

V2X UE(s) may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), internet of things (IoT) devices, or the like.

According to some embodiments of the present application, V2X UE(s) may include a portable wireless communication device, a smart phone, a cellular telephone, a flip phone, a device having a subscriber identity module, a personal computer, a selective call receiver, or any other device that is capable of sending and receiving communication signals on a wireless network.

According to some embodiments of the present application, V2X UE(s) includes wearable devices, such as smart watches, fitness bands, optical head-mounted displays, or the like. Moreover, V2X UE(s) may be referred to as a subscriber unit, a mobile, a mobile station, a user, a terminal, a mobile terminal, a wireless terminal, a fixed terminal, a subscriber station, a user terminal, or a device, or described using other terminology used in the art. V2X UE(s) may communicate directly with BS(s) via uplink (UL) communication signals.

A BS under NR V2X scenario may be referred to as a base unit, a base, an access point, an access terminal, a macro cell, a Node-B, an enhanced Node B (eNB), a gNB, a Home Node-B, a relay node, a device, a remote unit, or by any other terminology used in the art. A BS may be distributed over a geographic region. Generally, a BS is a part of a radio access network that may include one or more controllers communicably coupled to one or more corresponding base stations.

A BS is generally communicably coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more BSs may be communicably coupled to a mobility management entity (MME), a serving gateway (SGW), and/or a packet data network gateway (PGW).

A BS may serve a number of V2X UEs within a serving area, for example, a cell or a cell sector via a wireless communication link. A BS may communicate directly with one or more of V2X UEs via communication signals. For example, a BS may serve V2X UEs within a macro cell.

Sidelink communication between a Tx UE and a Rx UE under NR V2X scenario includes groupcast communication, unicast communication, or broadcast communication.

Embodiments of the present application may be provided in a network architecture that adopts various service scenarios, for example but is not limited to, 3GPP 3G, long-term evolution (LTE), LTE-Advanced (LTE-A), 3GPP 4G, 3GPP 5G NR (new radio), 3GPP LTE Release 12 and onwards, etc. It is contemplated that along with the 3GPP and related communication technology development, the terminologies recited in the present application may change, which should not affect the principle of the present application.

FIG. 1 illustrates an exemplary V2X communication system in accordance with some embodiments of the present application.

As shown in FIG. 1, the V2X communication system includes a base station, i.e., BS 102 and some V2X UEs, i.e., UE 101*a* and UE 101*b*. UE 101*a* and UE 101*b* may be configured to perform sidelink unicast transmission, sidelink groupcast transmission, or sidelink broadcast transmission. It is contemplated that, in accordance with some other embodiments of the present application, a V2X communication system may include more or fewer BSs, and more or fewer V2X UEs. Moreover, it is contemplated that names of V2X UEs (which represent a Tx UE, a Rx UE, and etc.) as illustrated and shown in FIG. 1 may be different, e.g., UE 101*c*, UE 104*f*, and UE 108*g* or the like.

In addition, although each V2X UE as shown in FIG. 1 is illustrated in the shape of a car, it is contemplated that a V2X communication system may include any type of UE (e.g., a roadmap device, a cell phone, a computer, a laptop, IoT (internet of things) device or other type of device) in accordance with some other embodiments of the present application.

According to some embodiments of FIG. 1, UE 101*a* functions as a Tx UE, and UE 101*b* functions as a Rx UE. UE 101*a* may exchange V2X messages with UE 101*b* through a sidelink, for example, PC5 interface as defined in 3GPP TS 23.303. UE 101*a* may transmit information or data to other UE(s) within the V2X communication system, through sidelink unicast, sidelink groupcast, or sidelink broadcast. For instance, UE 101*a* transmits data to UE 101*b* in a sidelink unicast session. UE 101*a* may transmit data to UE 101*b* and other UEs in a groupcast group (not shown in FIG. 1) by a sidelink groupcast transmission session. Also, UE 102 may transmit data to UE 101*b* and other UEs (not shown in FIG. 1) by a sidelink broadcast transmission session.

Alternatively, according to some other embodiments of FIG. 1, UE 101*b* functions as a Tx UE and transmits V2X messages, UE 101*a* functions as a Rx UE and receives the V2X messages from UE 101*b*.

Both UE 101*a* and UE 101*b* in the embodiments of FIG. 1 may transmit information to BS 102 and receive control information from BS 102, for example, via NR Uu interface. BS 102 may define one or more cells, and each cell may have a coverage area. As shown in FIG. 1, both UE 101*a* and UE 101*b* are within a coverage area 103 of BS 102.

BS 102 as illustrated and shown in FIG. 1 is not a specific base station, but may be any base station(s) in the V2X communication system. For example, if the V2X communication system includes two BSs 102, UE 101 being within a coverage area of any one the two BSs 102 may be called as a case that UE 101 is within a coverage of BS 102 in the V2X communication system; and only UE 101 being outside of coverage area(s) of both BSs 102 can be called as a case that UE 101 is outside of the coverage of BS 102 in the V2X communication system.

For 3GPP 5G NR V2X technology, if CBG-based HARQ-ACK feedback mechanism is supported, the following issues need to be addressed for Mode 1 in 3GPP Release 16: who decides whether a CBG-based transmission or HARQ-ACK feedback is performed on the allocated SL resource(s), and what is transmitted on the allocated PUCCH resource(s) to assist a BS for proper SL resource allocation for retransmission. Currently, for a V2X communication system, details of a CBG-based HARQ-ACK feedback mechanism have not been defined.

Some embodiments of the present application provide a method for implementing a CBG-based HARQ-ACK feedback mechanism. Some embodiments of the present application provide a method for transmitting a CBG-based transmission on a SL. Some embodiments of the present application provide a method for receiving CBG-based HARQ-ACK feedback. Some embodiments of the present application provide a method for transmitting an indicator to request a resource for a CBG-based retransmission.

Some embodiments of the present application provide an apparatus for implementing a CBG-based HARQ-ACK feedback mechanism. Some embodiments of the present application provide an apparatus for transmitting a CBG-based transmission on a SL. Some embodiments of the present application provide an apparatus for receiving CBG-based HARQ-ACK feedback. Some embodiments of the present application provide an apparatus for transmitting an indicator to request a resource for a CBG-based retransmission.

Figure 2:
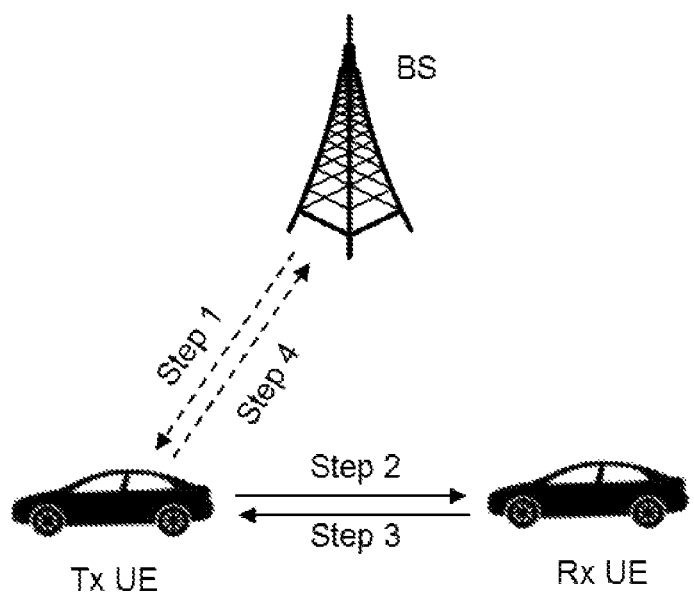
FIG. 2 illustrates a further exemplary V2X communication system in accordance with some embodiments of the present application.

FIG. 2 illustrates a further exemplary V2X communication system in accordance with some embodiments of the present application.

In the embodiments of FIG. 2, the V2X communication system includes a BS (e.g., BS 102 illustrated and shown in FIG. 1), a TX UE (e.g., UE 101*a* illustrated and shown in FIG. 1), and a RX UE (e.g., UE 101*b* illustrated and shown in FIG. 1). The embodiments of FIG. 2 show a method procedure performed between the BS, the Tx UE, and the Rx UE.

Specifically, in Step 1 as shown in FIG. 2, the BS sends SL grant information to the Tx UE. The SL grant information may indicate resource allocation result(s) for SL transmission(s) between the Tx UE and the Rx UE. The SL grant information may indicate a PUCCH resource for SL HARQ-ACK feedback report to the BS or the network. For example, the SL grant information is downlink control information (DCI) for sidelink dynamic grant; or the SL grant information is radio resource control (RRC) signalling for sidelink configured grant.

In Step 2 as shown in FIG. 2, the Tx UE transmits SL transmission(s) (e.g., one or more TBs) to the Rx UE. In Step 3 as shown in FIG. 2, the RX UE transmits SL HARQ-ACK feedback to the Tx UE according to actual decoding results. In Step 4 as shown in FIG. 2, the Tx UE sends the SL HARQ-ACK feedback on the allocated PUCCH resource to the BS.

Figure 3:
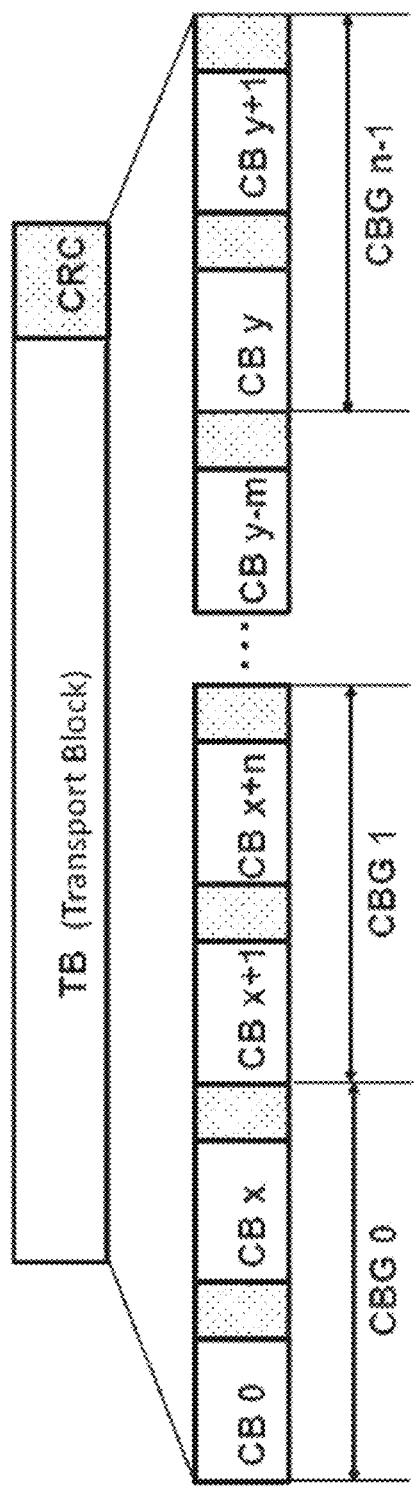
FIG. 3 illustrates an exemplary data format of a TB in accordance with some embodiments of the present application.

In 3GPP 5G NR, a TB (transport block) includes a plurality of code blocks (CBs). Several code blocks in a TB are grouped into one code block group (CBG). Each CB within a CBG is independently decodable. A TB may include a plurality of CBGs, while each CBG in the TB may include different number of CBs. That is, in NR Uu interface, one TB can be segmented to multiple CBGs, and each CBG may contain one or multiple CBs. One specific example is shown in FIG. 3 as below.

A TB which is not segmented into one or more CBs may be transmitted in a V2X communication system. HARQ-ACK feedback for such TB may be named as TB-based HARQ-ACK feedback or TB based HARQ-ACK feedback, and may include ACK or NACK corresponding to the TB.

A TB including one or more CBs may be transmitted in a V2X communication system. Such TB may be named as a CBG-based transmission or a CBG based transmission. HARQ-ACK feedback for such TB may be named as CBG-based HARQ-ACK feedback or CBG based HARQ-ACK feedback, and include ACK or NACK corresponding to each CBG or each CB in the TB.

For instance, each transmission between a Tx UE and a Rx UE illustrated and shown in FIG. 2 can contain one or more CBs. The Rx UE can transmit CBG-based HARQ-ACK feedback (e.g., in Step 3 as illustrated and shown in FIG. 2) to the Tx UE according to decoding results of the CBs.

Similarly, each transmission between a TX UE and a Rx UE (e.g., in Step 2 as illustrated and shown in FIG. 2) can contain one or more CBs. In SCI, CBG transmission information (CBGTI) may be used to inform the Rx UE which CBG(s) is transmitted in this transmission. The CBGTI may be transmitted in $1^{st}$ stage SCI or transmitted in $2^{nd}$ stage SCI. The Rx UE can transmit CBG-based HARQ-ACK feedback (e.g., in Step 3 as illustrated and shown in FIG. 2) to the TX UE according to decoding results of the CBs.

FIG. 3 illustrates an exemplary data format of a TB in accordance with some embodiments of the present application. In the embodiments of FIG. 3, a TB including cyclic redundancy check (CRC) bits are segmented to multiple CBGs, and each CBG includes two CBs.

In particular, as shown in FIG. 3, CBG 0 includes CB 0 and CB x, CBG 1 includes CB x+1 and CB x+n, and CBG n−1 includes CB y and CB y+1. Moreover, as shown in FIG. 3, each CBG includes CRC bits correspondingly. As described above, one CBG in a TB may include different number of CBs according to some other embodiments of the present application.

In some embodiments of the present application, after a Tx UE receives CBG-based HARQ-ACK feedback from a Rx UE, the Tx UE reports the sidelink HARQ-ACK feedback to a BS or a network. If the TB of SL transmission is correctly decoded by the Rx UE, e.g., all the CBGs are successful received by the RX UE or all the bits in the CBG-based HARQ-ACK feedback are 'ACK', the TX UE sends 'ACK' on the allocated PUCCH resource; otherwise, the TX UE sends 'NACK' on the allocated PUCCH resource. However, one drawback of these embodiments is that, in the case that a TB including multiple CBGs is transmitted but only a few CBGs in the multiple CBGs of the TB are incorrectly decoded, TB-based HARQ-ACK report does not precisely reflect a decoding result of the multiple CBGs, and thus cannot assist a BS to allocate the resources for retransmission properly. It will reduce a spectrum efficiency.

Figure 4:
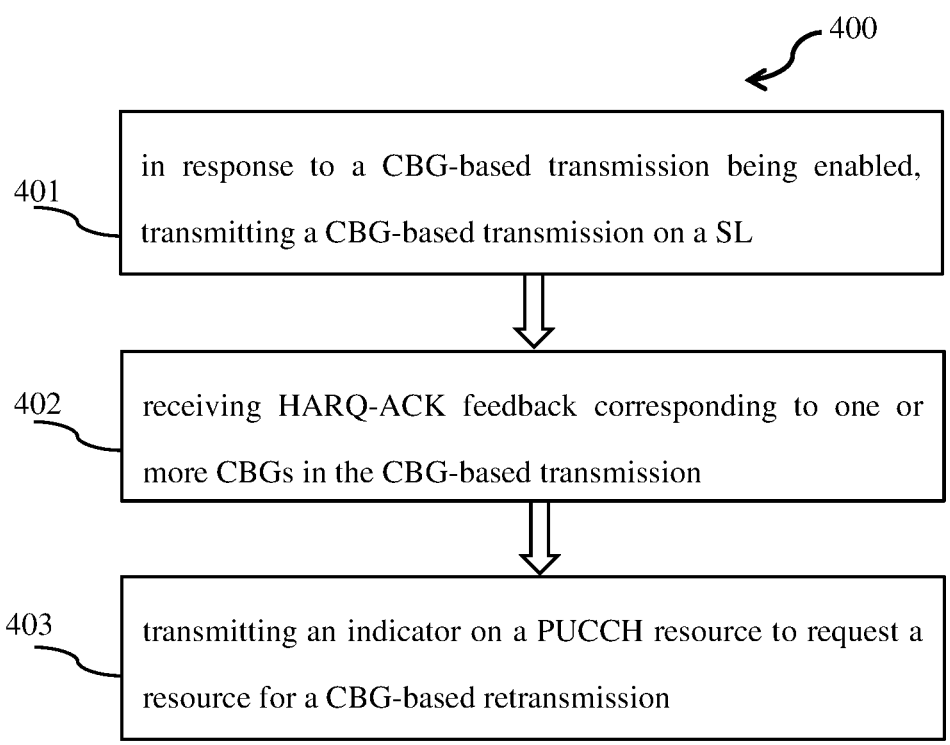
FIG. 4 illustrates an exemplary flow chart of a method for wireless communication in accordance with some embodiments of the present application.

FIG. 4 illustrates an exemplary flow chart of a method for wireless communication in accordance with some embodiments of the present application. The embodiments of FIG. 4 may be performed by a Tx UE (e.g., UE 101*a* or UE 101*b* illustrated and shown in FIG. 1, or the Tx UE illustrated and shown in FIG. 2).

In the exemplary method 400 as illustrated and shown in FIG. 4, in step 401, when a CBG-based transmission is enabled, a Tx UE transmits a CBG-based transmission on a SL. The CBG-based transmission includes one or more CBGs. In step 402, the Tx UE receives HARQ-ACK feedback corresponding to one or more CBGs in the CBG-based transmission. In step 403, the Tx UE transmits an indicator on a PUCCH resource to request a resource for a CBG-based retransmission.

In some embodiments of the present application, a network or a BS can enable or disable a CBG-based transmission. For instance, based on at least one of conditions: (1) a total number of sub-channels of the one or more resources in frequency domain is greater than a threshold and (2) there is a possibility that a pre-emption procedure happens on a SL, a network or a BS enables a CBG-based transmission.

After a network or a BS enables or disables a CBG-based transmission, the network or the BS may inform such decision to a Tx UE, to instruct data transmission. In one example, a BS transmits SL grant information to a Tx UE, the SL grant information indicates one or more resources allocated for one or more CBGs included in a CBG-based transmission, and the SL grant information includes an additional indicator to indicate whether the CBG-based transmission is enabled. The SL grant information may be downlink control information (DCI). In another example, RRC signalling transmitted to a Tx UE indicates whether the CBG-based transmission is enabled, e.g., for sidelink configured grant transmission.

In some embodiments of the present application, a UE can enable or disable a CBG-based transmission. In one example, a Tx UE decides whether a CBG-based transmission is enabled, and then, the Tx UE reports, to a BS or a network, a decision regarding whether the CBG-based transmission is enabled.

The decision regarding whether the CBG-based transmission is enabled may be transmitted on a PUCCH resource. For instance, the decision is transmitted with one bit on the PUCCH resource. One of values 0 and 1 of the bit may represent that the CBG-based transmission is enabled. The other one of the values 0 and 1 of the bit may represent that the CBG-based transmission is disabled.

In some embodiments of the present application, in response to the CBG-based transmission being enabled and one bit on the PUCCH resource being used to transmit the corresponding decision, remaining one or more bits on the PUCCH resource are used for the HARQ-ACK feedback. In some embodiments of the present application, in response to the CBG-based transmission being disabled and one bit on the PUCCH resource being used to transmit the corresponding decision, a second bit on the PUCCH resource is used for HARQ-ACK feedback corresponding to one or more TBs In some embodiments of the present application, if a payload size of a transport block (TB) is greater than a threshold, a Tx UE may decide that a CBG-based transmission is enabled. In some other embodiments of the present application, if there is a possibility that a pre-emption procedure happens on a SL between a Tx UE and Rx UE, the Tx UE may decide that a CBG-based transmission is enabled. Alternatively, if both a payload size of a transport block (TB) is greater than a threshold and there is a possibility that a pre-emption procedure happens on a SL, a Tx UE may decide that a CBG-based transmission is enabled.

In some embodiments of the present application, whether the CBG-based transmission is enabled is implicitly indicated, instead of being explicitly indicated. For example, at least one of the following conditions may implicitly indicate that the CBG-based transmission is enabled:

(1) one or more resources are within a resource pool that enables a CBG-based transmission, and the one or more resources are allocated for one or more CBGs, and (2) a total number of sub-channels of the one or more resources in frequency domain is greater than a threshold.

A resource pool may be configured with CBG-based transmission enabled or disabled. The threshold may be configured by a network or may be defined in 3GPP standard document.

With reference to FIG. 4, as shown in Step 403, the Tx UE transmits an indicator on a PUCCH resource to request a resource for a CBG-based retransmission. In some embodiments of the present application, a quantity of bits included in the indicator is related to a maximum number of CBGs included in a TB. A maximum number of CBGs included in a TB may be named as a maximum number of CBGs per TB. For example, a quantity of bits included in the indicator is related to a parameter "maxCodeBlockGroupsPerTransportBlock" as defined in 3GPP TS 38.331. The maximum number of CBGs included in a TB may be configured based on a type of a resource pool. The maximum number of CBGs included in a TB may be configured based on capabilities of a UE.

Several solutions related to details of the indicator as shown in Step 403 of FIG. 4 are described as follows.

Solution 1

In Solution 1, the indicator as shown in Step 403 of FIG. 4 may include at least one of (1) HARQ-ACK feedback corresponding to one or more CBGs and (2) a total number of CBGs actually transmitted on the SL. More specifically, a TX UE may report CBG-based HARQ-ACK feedback to a BS or a network. Alternatively, the Tx UE may report, to a BS or a network, a total number of actually transmitted CBGs on a SL. Otherwise, the Tx UE may report, to a BS or a network, both CBG-based HARQ-ACK feedback and the number of actually transmitted CBGs on the SL.

In some embodiments of the present application of Solution 1, after receiving SL grant information (e.g., DCI) from a BS, a Tx UE (which may also be named as SL Tx UE) performs a SL CBG-based transmission to a Rx UE (which may also be named as SL Rx UE) on a SL. Then, the Tx UE receives CBG-based HARQ-ACK feedback from the Rx UE. After that, the Tx UE reports the received CBG-based HARQ-ACK feedback to the BS or the network. Meanwhile, the Tx UE can also report, to the BS or the network, the number of actually transmitted CBGs on the SL. The Tx UE may report at least one of the CBG-based HARQ-ACK feedback and the number of actually transmitted CBGs on a PUCCH resource.

Given the above, based on the CBG-based HARQ-ACK feedback and the number of actually transmitted CBGs on the SL, the BS may determine how many resources to be needed for retransmission, and then may reallocate the corresponding resource(s) for the retransmission.

In other words, in the embodiments of Solution 1, the BS doesn't need to know which specific CBG(s) are incorrectly decoded, the BS only needs to know information regarding how many resources will be needed for retransmission. Thus, these embodiments are simple and efficient.

FIG. 5 illustrates an exemplary mapping table related to a CBG-based transmission in accordance with some embodiments of the present application. The embodiments of FIG. 5 correspond to Solution 1.

The first column of the table shown in FIG. 5 is Maximum number of CBG(s) included in a TB, which represents a maximum number of CBGs per TB (e.g., "maxCodeBlock-GroupsPerTransportBlock" as defined in 3GPP TS 38.331). The maximum number of CBGs per TB is configured per a type of resource pool or per capabilities of a UE.

The second column of the table shown in FIG. 5 is Bits for CBG-based HARQ-ACK feedback, which represents a quantity of bits needed for transmitting CBG-based HARQ-ACK feedback in accordance with each configured Maximum number of CBG(s) included in a TB.

The third column of the table shown in FIG. 5 is Bits for a total number of actually transmitted CBGs, which represents a total number of bits needed for CBGs in a TB actually transmitted on a SL.

As shown in FIG. 5, Maximum number of CBG(s) included in a TB may be configured as 2, 4, 6, or 8. Accordingly, corresponding to each configured Maximum number of CBG(s) included in a TB, Bits for CBG-based HARQ-ACK feedback are 2 bits, 4 bits, 6 bits, and 8 bits, respectively. Also, corresponding to each configured Maximum number of CBG(s) included in a TB, Bits for a total number of actually transmitted CBGs are 1 bits, 2 bits, 3 bits, and 3 bits, respectively.

As described in Solution 1, a BS doesn't need to know which CBGs are not correctly decoded. Thus, the TX UE only needs to report how many CBGs are incorrectly decoded. However, only reporting how many CBGs are incorrectly decoded is not sufficient, the TX UE can also report the number of actually transmitted CBGs on a SL.

Solution 2

In Solution 2, the indicator as shown in Step 403 of FIG. 4 may include at least one of: (1) a total number of incorrectly decoded CBGs, or a total number of correctly decoded CBGs; and (2) a total number of CBGs actually transmitted on the SL.

In some embodiments of the present application of Solution 2, a TX UE reports the number of CBGs that are incorrectly decoded, and/or also reports the number of actually transmitted CBG on a sidelink.

More specifically, a TX UE may report a total number of incorrectly decoded CBGs to a BS or a network. Alternatively, a TX UE may report a total number of correctly decoded CBGs to a BS or a network. The Tx UE may also report, to a BS or a network, a total number of actually transmitted CBGs on a SL. Otherwise, the Tx UE may report, to a BS or a network, both a total number of incorrectly decoded CBGs and the number of actually transmitted CBGs on the SL. The Tx UE may report, to a BS or a network, both a total number of correctly decoded CBGs and the number of actually transmitted CBGs on the SL.

FIG. 6A illustrates a further exemplary mapping table related to a CBG-based transmission in accordance with some embodiments of the present application. The embodiments of FIG. 6A correspond to Solution 2.

As can be seen, the first and third columns of the table shown in FIG. 6A are the same as those of the table shown in FIG. 5, which have the same meanings and the same values. The second column of the table shown in FIG. 6A is Bits for a total number of incorrectly decoded CBGs, which represents a quantity of bits needed for transmitting a total number of incorrectly decoded CBGs in a TB. As shown in FIG. 6A, corresponding to each configured Maximum number of CBG(s) included in a TB (which is configured as 2, 4, 6, or 8), Bits for a total number of incorrectly decoded CBGs are 2 bits, 3 bits, 3 bits, and 4 bits, respectively.

FIG. 6B illustrates another exemplary mapping table related to a CBG-based transmission in accordance with some embodiments of the present application. Similar to FIG. 6A, the embodiments of FIG. 6B correspond to Solution 2.

As can be seen, the first and third columns of the table shown in FIG. 6B are the same as those of the table shown in FIGS. 5 and 6A, which have the same meanings and the same values. The second column of the table shown in FIG. 6A is Bits for a total number of correctly decoded CBGs, which represents a quantity of bits needed for transmitting a total number of correctly decoded CBGs in a TB. As shown in FIG. 6B, corresponding to each configured Maximum number of CBG(s) included in a TB, which is configured as 2, 4, 6, or 8, Bits for a total number of correctly decoded CBGs are 2 bits, 3 bits, 3 bits, and 4 bits, respectively.

Solution 3

In some embodiments of the present application of Solution 3, the indicator as shown in Step 403 of FIG. 4 may include (1) a ratio between a total number of incorrectly decoded CBGs and a total number of CBGs actually transmitted on the SL; or (2) a ratio between a total number of correctly decoded CBGs and the total number of CBGs actually transmitted on the SL.

For example, a Tx UE can only report a ratio of CBGs that are incorrectly decoded. The ratio may be defined as: number of failed CBGs/number of actually transmitted CBGs. That is to say, the ratio is equal to a result that a total number of failed CBGs is divided by a total number of actually transmitted CBGs.

One advantage of the embodiments of Solution 3 is that a payload size of a PUCCH resource is reduced. Moreover, the embodiments of Solution 3 are simple and easy to implement.

FIG. 7 illustrates an exemplary mapping table related to ratios of resources in accordance with some embodiments of the present application. The embodiments of FIG. 7 correspond to Solution 3.

The first column of the table shown in FIG. 7 is Total number of actually transmitted CBGs, which represents a total number of CBGs actually transmitted on a SL. The second column of the table is Values of ratios. In some embodiments of the present application, Values of ratios may represent all possible ratios between a total number of incorrectly decoded CBGs and a total number of CBGs actually transmitted on the SL. In some additional embodiments of the present application, Values of ratios may represent all possible ratios between a total number of correctly decoded CBGs and a total number of CBGs actually transmitted on the SL.

For instance, in the second row of the table shown in FIG. 7, Values of ratios {0, 1}/1 represent two possible ratios, 0/1 (i.e., 0) and 1/1 (i.e., 1). In the fifth row of the table shown in FIG. 7, Values of ratios {0, 1, 2, 3, 4}/4 represent five possible ratios, 0/4 (i.e., 0), 1/4, 2/4 (i.e., 0.5), 3/4, and 4/4 (i.e., 1). Other rows of the table shown in FIG. 7 are in the same manner.

In the embodiments of FIG. 7, a Tx UE may transmit, to a BS or a network, one ratio within the possible ratios in the table according to an actual decoding result of CBGs transmitted on the SL. Based on the received ratio, the BS may determine a proportion of resources which are needed for a CBG-based retransmission.

In some further embodiments of the present application of Solution 3, each of the one or more CBGs includes one or more CBs, and the indicator as shown in Step 403 of FIG. 4 may include (1) a ratio between a total number of incorrectly decoded CBs and a total number of CBs actually transmitted on the SL; or (2) a ratio between a total number of correctly decoded CBs and the total number of CBs actually transmitted on the SL. A mapping table related to ratios of resources regarding CBs in accordance with these embodiments of the present application may be similar to the mapping table shown in the embodiments of FIG. 7.

FIG. 8 illustrates a further exemplary mapping table related to ratios of resources in accordance with some embodiments of the present application. Similar to FIG. 7, the embodiments of FIG. 8 correspond to Solution 3.

Similar to FIGS. 5, 6A, and 6B, the first column of the table shown in FIG. 8 is Maximum number of CBG(s) included in a TB, which represents a maximum number of CBGs per TB (e.g., "maxCodeBlockGroupsPerTransportBlock" as defined in 3GPP TS 38.331).

Similar to FIG. 7, the second column of the table shown in FIG. 8 is Values of ratios. Likewise, in some embodiments of the present application, Values of ratios may represent all possible ratios between a total number of incorrectly decoded CBGs and a total number of CBGs actually transmitted on the SL; and in some additional embodiments of the present application, Values of ratios may represent all possible ratios between a total number of correctly decoded CBGs and a total number of CBGs actually transmitted on the SL.

The third column of the table shown in FIG. 8 is Bits in PUCCH resource, which represents a quantity of bits needed for transmitting, on a PUCCH resource, a value of a ratio selected from Values of ratios in the second column of the table.

More specifically, as shown in FIG. 8, Maximum number of CBG(s) included in a TB may be configured as 2, 4, 6, or 8. For instance, in the second row of the table shown in FIG. 8, corresponding to Maximum number of CBG(s) included in a TB configured as 2, Values of ratios are {0, 1/2, 1}, and Bits in PUCCH resource is 2 bits. In other words, there are three possible values of ratios (which are between a total number of correctly or incorrectly decoded CBGs and a total number of CBGs actually transmitted on the SL): 0, 1/2, or 1. Accordingly, 2 bits on a PUCCH resource is needed for transmitting any possible value of such ratios.

Similarly, in the fifth row of the table shown in FIG. 8, corresponding to Maximum number of CBG(s) included in a TB configured as 8, Values of ratios are {0, 1/8, 1/7, 1/6, 1/5, 1/4, 1/3, 2/7, 2/5, 1/2, 2/3, 3/8, 3/7, 3/5, 3/4, 4/7, 4/5, 5/8, 5/7, 5/6, 6/7, 7/8, 1}, and Bits in PUCCH resource is 5 bits. In other words, there are twenty-three possible values of ratios (which are between a total number of correctly or incorrectly decoded CBGs and a total number of CBGs actually transmitted on the SL): 0, 1/8, 1/7, 1/6, 1/5, 1/4, 1/3, 2/7, 2/5, 1/2, 2/3, 3/8, 3/7, 3/5, 3/4, 4/7, 4/5, 5/8, 5/7, 5/6, 6/7, 7/8, or 1. Accordingly, 5 bits on a PUCCH resource is needed for transmitting any possible value of such ratios.

The third and fourth rows of the table shown in FIG. 8 are in the same manner as the second and fifth rows of the table shown in FIG. 8.

Solution 4

In Solution 4, a TX UE reports, to a BS or a network, a ratio of resources that are still needed for retransmission. Alternatively, a TX UE reports, to a BS or a network, a ratio of resources that can be released during retransmission. Solution 4 provides a table of ratios with a coarse granularity, and thus reduces a payload size of PUCCH resource.

In some embodiments of the present application of Solution 4, the indicator as shown in Step 403 of FIG. 4 is selected from one or more values that correspond to one or more pre-defined ratios. Each of the one or more values may be represented by one or more bits within a pre-defined table. The pre-defined table can be defined in 3GPP standard document. The pre-defined table can be configured by a BS or a network. The payload size of PUCCH depends on the size of the pre-defined table.

Pre-defined ratios may be "ratios of requested resources needed for retransmission" or "ratios of released resources during retransmission" according to different embodiments of the present application.

For example, in a case that a TB contains one or more CBGs, a ratio selection from the pre-defined ratios may depend on CBG level. In particular:

1. If the pre-defined ratios represent ratios of resources that are still needed, a TX UE can select, from the pre-defined ratios, a pre-defined ratio which is $$\geq \frac{a \text{ number of failed } CBGs}{a \text{ total number of transmitted } CBGs}.$$

2. If the pre-defined ratios represent ratios of resources that can be released, a TX UE can select, from the pre-defined ratios, a pre-defined ratio which is <=

$$\frac{a \text{ number of correctly decoded } CBGs}{a \text{ total number of transmitted } CBGs}.$$

For example, in a case that each CBG in a TB contains different number of CBs, a ratio selection from the pre-defined ratios may depend on CB level, instead of CBG level. In particular:

1. If the pre-defined ratios represent ratios of resources that are still needed, a TX UE can select, from the pre-defined ratios, a pre-defined ratio which is $$\geq \frac{a \text{ number of failed } CBs}{a \text{ total number of transmitted } CBs}.$$

2. If the pre-defined ratios represent ratios of resources that can be released, a TX UE can select, from the pre-defined ratios, a pre-defined ratio which is <=

$$\frac{a \text{ number of correctly decoded } CBs}{a \text{ total number of transmitted } CBs}.$$

In some embodiments of the present application of Solution 4, the Tx UE compares pre-defined ratios within a pre-defined table with an actual ratio, the actual ratio is between a total number of CBGs to be retransmitted and a total number of CBGs actually transmitted on the SL; selects, from the pre-defined ratios, a minimum ratio that is greater than the actual ratio; and uses a value within the one or more values, which corresponds to the minimum ratio, as the indicator.

In some embodiments of the present application of Solution 4, the Tx UE compares pre-defined ratios within a pre-defined table with an actual ratio, the actual ratio is between a total number of CBs to be retransmitted and a total number of CBs actually transmitted on the SL; selects, from the pre-defined ratios, a minimum ratio that is greater than the actual ratio; and uses a value within the one or more values, which corresponds to the minimum ratio, as the indicator.

FIG. 9 illustrates another exemplary mapping table related to ratios of resources in accordance with some embodiments of the present application.

The embodiments of FIG. 9 correspond to Solution 4 and refer to a pre-defined table related to ratios of resources using 2 bits on PUCCH resource. Some other embodiments of the present application of Solution 4 may refer to different pre-defined tables using different number of bits on PUCCH resource.

The first column of the table shown in FIG. 9 is Value in PUCCH resource, which represents four possible values of 2 bits on PUCCH resource: '00', '01' '10' and '11'. The second column of the table shown in FIG. 9 is Ratio of requested resources, which represents pre-defined ratios: 0, 1/3, 2/3, and 100%.

In some embodiments of the present application, the Tx UE selects the minimum ratio based on CBG-based HARQ-ACK feedback. If the pre-defined ratios represent "ratios of requested resources needed for retransmission", the TX UE can select, from the second column of the table shown in FIG. 9, a pre-defined ratio which is $$\geq \frac{\text{a number of failed } CBGs}{\text{a total number of transmitted } CBGs}.$$

For a specific example, when 5 CBGs are initially transmitted in a TB on a SL between a Tx UE and a Rx UE, but 2 CBGs in the TB are incorrectly decoded by the Rx UE, after receiving the corresponding CBG-based HARQ-ACK feedback from the Rx UE, the Tx UE may determine that 2/5 of resources (i.e., 40% of the resources) are still needed for the incorrectly decoded 2 CBGs. Since the table shown in FIG. 9 include four pre-defined ratios (i.e., 0, 1/3, 2/3, and 100%), the Tx UE selects the third pre-defined ratio (i.e., 2/3) which is greater than 2/5, and then transmits the third value in PUCCH resource (i.e., '10') to the BS. Upon receiving the value in PUCCH resource '10', the BS may determine that 2/3 of the resources originally allocated for initially transmitted 5 CBGs are needed for CBG retransmissions on the SL. Then, the BS will allocate the corresponding resources for CBG retransmissions.

In some other embodiments of the present application, if the pre-defined ratios represents "ratios of released resources during retransmission," the TX UE can select, from the second column of the table shown in FIG. 9, a pre-defined ratio which is $$\leq \frac{\text{a number of correctly decoded } CBGs}{\text{a total number of transmitted } CBGs}.$$

For a specific example, when 5 CBGs are initially transmitted in a TB on a SL between a Tx UE and a Rx UE, but 2 CBGs in the TB are incorrectly decoded by the Rx UE, after receiving the corresponding CBG-based HARQ-ACK feedback from the Rx UE, the Tx UE may determine that 2/5 of resources (i.e., 40% of the resources) are still needed for the incorrectly decoded 2 CBGs, while 3/5 of resources (i.e., 60% of the resources) will be released during subsequent CBG retransmissions. Since the table shown in FIG. 9 include four pre-defined ratios (i.e., 0, 1/3, 2/3, and 100%), the Tx UE selects the second pre-defined ratio (i.e., 1/3) which is less than 3/5, and then transmits the second value in PUCCH resource (i.e., '01') to the BS. Upon receiving the value in PUCCH resource '01', the BS may determine that 1/3 of the resources originally allocated for initially transmitted 5 CBGs need to be released during CBG retransmissions on the SL. Then, the BS will allocate the corresponding resources for CBG retransmissions.

In some embodiments of the present application, the Tx UE selects the minimum ratio based on both CBG-based HARQ-ACK feedback and channel state information (CSI). For instance, in the above-mentioned two specific examples, if the CSI represents that the channel quality is good, the Tx UE may select a different pre-defined ratio from the table shown in FIG. 9, to indicate that less resources are needed for CBG or CB retransmissions or indicate that more resources could be released during the CBG or CB retransmissions. Alternatively, if the CSI represents that the channel quality is bad, the Tx UE may select a different pre-defined ratio from the table shown in FIG. 9, to indicate that more resources are needed for CBG or CB retransmissions or indicate that less resources could be released during the CBG or CB retransmissions.

In some embodiments of the present application, a BS configures a type of HARQ-ACK report which is used by a Tx UE and the BS via NR Uu interface. The BS may indicate to a Tx UE that TB-based HARQ-ACK report is used via NR Uu interface. The BS may indicate to a Tx UE that CBG-based HARQ-ACK report is used over NR Uu interface. For example, an indicator in DCI is used to indicate the type of HARQ-ACK report via NR Uu interface.

The allocated PUCCH resource may be implicitly used to indicate the type of HARQ-ACK report over NR Uu interface. For instance, a BS allocates a PUCCH resource with one bit to mean that TB-based HARQ-ACK report is used over NR Uu interface; otherwise, a BS allocates PUCCH resources with two or more bits to mean that CBG-based HARQ-ACK report is used over NR Uu interface.

Figure 10:
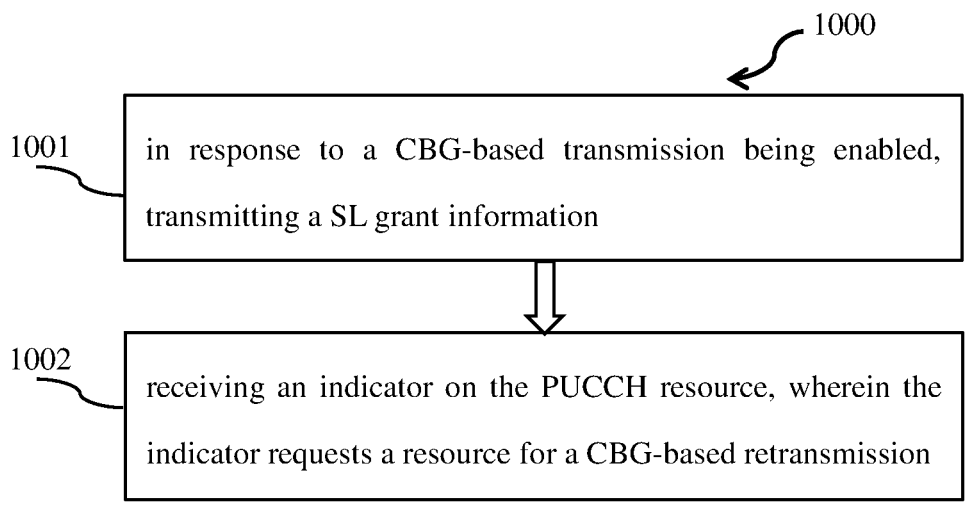
FIG. 10 illustrates a further exemplary flow chart of a method for wireless communication in accordance with some embodiments of the present application.

FIG. 10 illustrates a further exemplary flow chart of a method for wireless communication in accordance with some embodiments of the present application. The embodiments of FIG. 10 may be performed by a BS (e.g., BS 102 as illustrated and shown in FIG. 1 and the BS illustrated and shown in FIG. 2) or a network.

In the exemplary method 1000 as illustrated and shown in FIG. 10, in step 1001, a BS or a network transmits a SL grant information in response to a CBG-based transmission being enabled. The SL grant information indicates one or more resources allocated for a CBG-based transmission on a SL. The SL grant information further indicates a physical uplink control channel (PUCCH) resource, and the CBG-based transmission includes one or more CBGs. In step 1002, the BS or the network receives an indicator on the PUCCH resource. The indicator requests a resource for a CBG-based retransmission.

Details described in all other embodiments of the present application (for example, details regarding SL grant information and the indicator which requests a resource for a CBG-based retransmission) are applicable for the embodiments of FIG. 10. Moreover, details described in the embodiments of FIG. 10 are applicable for all the embodiments of FIGS. 1-9 and 11.

Figure 11:
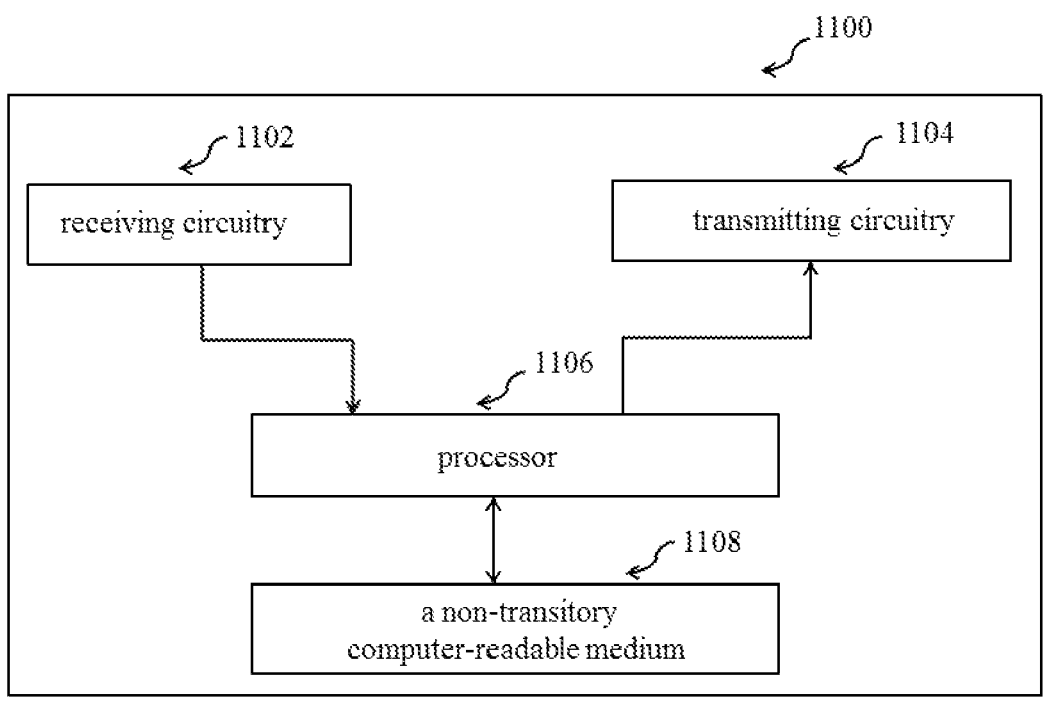
FIG. 11 illustrates a block diagram of an exemplary apparatus in accordance with some embodiments of the present application.

FIG. 11 illustrates a block diagram of an exemplary apparatus in accordance with some embodiments of the present application. Referring to FIG. 11, the apparatus 1100 includes a receiving circuitry 1102, a transmitting circuitry 1104, a processor 1106, and a non-transitory computer-readable medium 1108. The processor 1106 is coupled to the non-transitory computer-readable medium 1108, the receiving circuitry 1102, and the transmitting circuitry 1104.

It is contemplated that some components are omitted in FIG. 11 for simplicity. In some embodiments, the receiving circuitry 1102 and the transmitting circuitry 1104 may be integrated into a single component (e.g., a transceiver).

In some embodiments, the non-transitory computer-readable medium 1108 may have stored thereon computer-executable instructions to cause a processor to implement the operations with respect to BS(s) as described above. For example, upon execution of the computer-executable instructions stored in the non-transitory computer-readable medium 1108, the processor 1106 and the transmitting circuitry 1104 perform the method of FIG. 4, including: transmitting a CBG-based transmission on a SL, in response to a CBG-based transmission being enabled; receiving HARQ-ACK feedback corresponding to one or more CBGs in the CBG-based transmission; and transmitting an indicator on a PUCCH resource to request a resource for a CBG-based retransmission, in response to the HARQ-ACK feedback.

In some embodiments, the non-transitory computer-readable medium 1308 may have stored thereon computer-executable instructions to cause a processor to implement the operations with respect to Tx UE(s) as described above. For example, upon execution of the computer-executable instructions stored in the non-transitory computer-readable medium 1108, the processor 1106 and the transmitting circuitry 1104 perform the method of FIG. 10, including: in response to a CBG-based transmission being enabled, transmitting a SL grant information; and receiving an indicator on the PUCCH resource, wherein the indicator requests a resource for a CBG-based retransmission.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method performed by a first user equipment (UE), comprising:
    transmitting, in response to a code block group (CBG)-based transmission being enabled, the CBG-based transmission on a sidelink (SL) to a second UE, wherein the CBG-based transmission comprises one or more CBGs;
    receiving, from the second UE, hybrid automatic repeat request-acknowledge (HARQ-ACK) feedback corresponding to the one or more CBGs;
    selecting, from one or more values corresponding to one or more pre-defined ratios, an indicator to request a resource for a CBG-based retransmission; and
    transmitting, in response to the HARQ-ACK feedback, the indicator on a physical uplink control channel (PUCCH) resource.

2. The method of claim 1, further comprising receiving, from a network entity (NE), signaling that indicates the CBG-based transmission is enabled, wherein the signaling comprises radio resource control (RRC) signaling.

3. The method of claim 1, further comprising receiving SL grant information comprising one or more resources allocated for the one or more CBGs, wherein the SL grant information indicates that the CBG-based transmission is enabled.

4. A first user equipment (UE) for wireless communication, comprising:
    at least one memory; and
    at least one processor coupled with the at least one memory and configured to cause the first UE to:
        transmit, in response to a code block group (CBG)-based transmission being enabled, a CBG-based transmission on a sidelink (SL) to a second UE, wherein the CBG-based transmission comprises one or more CBGs;
        receive, from the second UE, hybrid automatic repeat request-acknowledge (HARQ-ACK) feedback corresponding to the one or more CBGs;
        select, from one or more values corresponding to one or more pre-defined ratios, an indicator to request a resource for a CBG-based retransmission; and
        transmit, in response to the HARQ-ACK feedback, the indicator on a physical uplink control channel (PUCCH) resource.

5. A network equipment (NE) for wireless communication, comprising:
    at least one memory; and
    at least one processor coupled with the at least one memory and configured to cause the NE to:

transmit, in response to a code block group (CBG)-based transmission comprising one or more CBGs being enabled, a sidelink (SL) grant information, wherein the SL grant information indicates one or more resources allocated for the CBG-based transmission on a SL between a first user equipment (UE) and a second UE, and wherein the SL grant information indicates a physical uplink control channel (PUCCH) resource; and receive an indicator on the PUCCH resource, wherein the indicator requests a resource for a CBG-based retransmission, and wherein the indicator is selected from one or more values corresponding to one or more pre-defined ratios.

6. The first UE of claim 4, wherein the at least one processor is further configured to cause the first UE to determine that the CBG-based transmission is enabled.

7. The first UE of claim 6, wherein the at least one processor is further configured to cause the first UE to determine that the CBG-based transmission is enabled in response to at least one of:
a payload size of a transport block (TB) being greater than a first threshold; or
a likelihood that a pre-emption procedure happens on the SL being greater than a second threshold.

8. The first UE of claim 6, wherein the at least one processor is further configured to cause the first UE to transmit, on the PUCCH resource, an indication that the CBG-based transmission is enabled.

9. The first UE of claim 8, wherein the indication comprises a bit, and wherein a value of 0 or 1 of the bit represents that the CBG-based transmission is enabled and another of the value of 0 or 1 of the bit represents that the CBG-based transmission is disabled.

10. The first UE of claim 9, wherein the at least one processor is further configured to cause the first UE to:
transmit, in response to the CBG-based transmission being enabled, the HARQ-ACK feedback using a remaining one or more bits on the PUCCH resource; and
transmit, in response to the CBG-based transmission being disabled, HARQ-ACK feedback corresponding to one or more transport blocks (TBs) using an additional bit on the PUCCH resource.

11. The first UE of claim 4, wherein the CBG-based transmission being enabled is implicitly indicated by at least one of:
one or more resources being within a resource pool that enables the CBG-based transmission, wherein the one or more resources are allocated for the one or more CBGs; or
a total number of sub-channels of the one or more resources in a frequency domain being greater than a threshold.

12. The first UE of claim 4, wherein a quantity of bits corresponding to the indicator is related to a maximum number of CBGs in a transport block (TB).

13. The first UE of claim 4, wherein the indicator comprises at least one of:

the HARQ-ACK feedback corresponding to the one or more CBGs; or
a total number of CBGs actually transmitted on the SL.

14. The first UE of claim 4, wherein the indicator comprises at least one of:
one of a total number of incorrectly decoded CBGs or a total number of correctly decoded CBGs; or
a total number of CBGs actually transmitted on the SL.

15. The first UE of claim 4, wherein the indicator comprises at least one of:
a ratio between a total number of incorrectly decoded CBGs and a total number of CBGs actually transmitted on the SL; or
a ratio between a total number of correctly decoded CBGs and the total number of CBGs actually transmitted on the SL.

16. The first UE of claim 4, wherein respective CBGs of the one or more CBGs comprise one or more code blocks (CBs), and wherein the indicator comprises at least one of:
a ratio between a total number of incorrectly decoded CBs and a total number of CBs actually transmitted on the SL; or
a ratio between a total number of correctly decoded CBs and the total number of CBs actually transmitted on the SL.

17. The first UE of claim 4, wherein respective values of the one or more values are represented by one or more bits within a pre-defined table.

18. The first UE of claim 4, wherein the at least one processor is further configured to cause the first UE to:
compare the one or more pre-defined ratios with an actual ratio between a total number of CBGs to be retransmitted and a total number of CBGs actually transmitted on the SL;
select, from the one or more pre-defined ratios, a minimum ratio that is greater than the actual ratio; and
use a value within the one or more values that corresponds to the minimum ratio as the indicator.

19. A method performed by a network equipment (NE), the method comprising:
transmit, in response to a code block group (CBG)-based transmission comprising one or more CBGs being enabled, a sidelink (SL) grant information, wherein the SL grant information indicates one or more resources allocated for the CBG-based transmission on a SL between a first user equipment (UE) and a second UE, and wherein the SL grant information indicates a physical uplink control channel (PUCCH) resource; and
receive an indicator on the PUCCH resource, wherein the indicator requests a resource for a CBG-based retransmission, and wherein the indicator is selected from one or more values corresponding to one or more pre-defined ratios.

20. The NE of claim 5, wherein the at least one processor is further configured to cause the NE to receive, on the PUCCH resource, an indication that the CBG-based transmission is enabled.

* * * * *